Patented Dec. 12, 1939

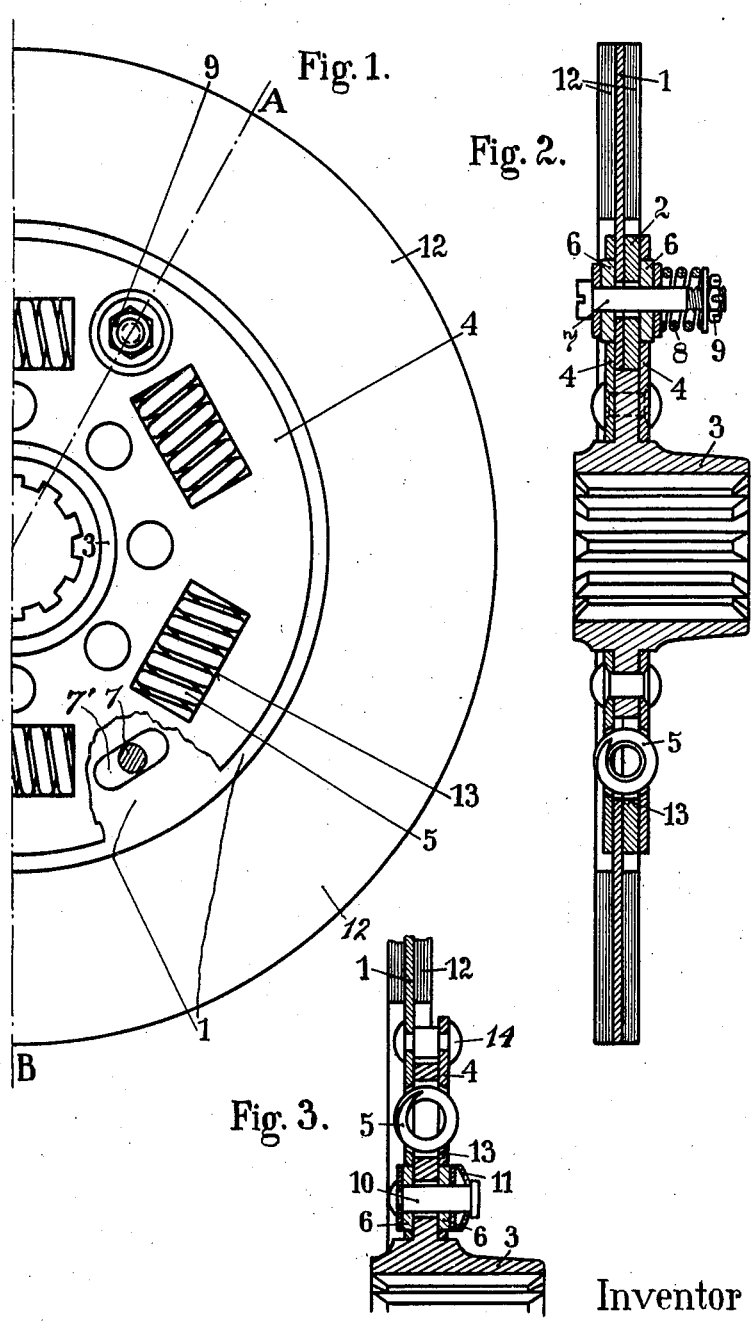

2,183,130

UNITED STATES PATENT OFFICE 2,183,130

DISK COUPLING PROVIDED WITH VIBRATION ABSORBERS

Richard Binder, Schweinfurt, Germany

Application September 26, 1938, Serial No. 231,700
In Germany October 4, 1937

3 Claims. (Cl. 192—68)

The present invention relates to improvements in plate or disk couplings provided with vibration absorbers in which springs are inserted between the coupling disk, carrying the frictional lining, and the hub for the purpose of interrupting the rigid transmission between the motor and the drive gear, thereby preventing the transfer of torsional vibrations of the motor upon the drive gear or vice versa.

Various constructions of such coupling disks having interposed springs are known already. To obtain a satisfactory efficiency and to prevent the resilient disk from vibrating, it is necessary to effect braking by friction. Several methods also are already known to produce friction in such coupling disks. This very often is carried into effect in such a manner, that the two outer guide disks are caused to press against the coupling disk, whereby friction between two metal surfaces is obtained. Moreover, it is known already to insert members of frictional material between the outer disk and the inner part of the disk, to prevent the friction between two metal surfaces. Furthermore, it has already been proposed to change or increase the pressure of the outer guide disk against the friction disks by connecting together both disks by a plurality of bolts which by means of springs effect an additional pressure of the two disks against the coupling disk or the friction members respectively.

All these arrangements, however, have the disadvantage that the outer guide disks, serving also to transfer the torque, must be made relatively heavy, so that their resiliency in a lateral direction is too small. It is, therefore, very difficult to obtain uniform friction, and a decrease of resiliency occurs after a very slight wear of the intermediate friction layers. Due to the insufficient resiliency of the guide disks the above mentioned additional spring arrangement has little utility. To exactly determine this friction which is of greatest importance for the satisfactory operation of the damping device and to obtain as slight a change as possible if wear of the intermediate friction layers occurs, the friction disks are, according to the invention, so arranged, that they are absolutely independent of the lateral resiliency of the guide disks, and the friction pressure is obtained exclusively by the springs provided for this purpose. The friction disks or the friction members respectively, therefore, are, according to the invention, arranged in recesses of the guide disks in such a manner, that they are carried by the latter with substantially no circumferential play, but may easily be shifted in an axial direction against the action of their springs pressing said disks into frictional engagement with certain coupling parts. The friction members are connected together by a bolt and a spring, and the bolt may carry a thread, so that the pressure of the spring acting upon the friction disks may be controlled by a nut screwed upon said bolt.

In the accompanying drawing two constructions according to the invention are shown by way of example. A single friction disk only together with the parts connected thereto is shown, whereas the casing of the coupling which may be of known construction has been omitted.

In this drawing:

Fig. 1 shows a side elevation of one half of a coupling according to the invention, Fig. 2 is a section on the line A—B of a first modification, and Fig. 3 is a part sectional elevation of a second modification, the section being taken along a line similar to the section line of Fig. 2.

The coupling disk 1, carrying the frictional lining 12, is rotatably mounted upon the hub 3. A reinforcing ring 2 is connected to the coupling disk 1. The two guide disks 4 are riveted to the hub 3. The coupling disk 1 and the reinforcing ring 2 as well as the two guide disks 4 are provided with recesses 13 in which springs 5 are mounted which are compressed as soon as the disk is loaded by a torque acting in the one or the other direction. According to the invention, the guide disks 4 are provided with recesses of circular or any desired other form into which friction members 6 fit in such a manner, that they are carried by the guide disks 4 in the circumferential direction, but may easily be shifted in the direction of the axis. These two friction members 6 are resiliently connected together by a screw 7 which extends through correspondingly shaped oval holes 7' provided in the coupling disk 1 and the reinforcing ring 2. The adjustment of the surface pressure is effected by means of a nut 9 acting upon a spring 8.

Figure 3 shows a similar construction in which, however, the coupling disk 1 simultaneously is formed as guide disk, whereas the flange of the hub 3 is of such a diameter that the recesses 13 for the reception of the springs 5 may directly be provided in same. The coupling disk 1 and the guide disk 4 facing said coupling disk are connected together in a well known manner by means of spacing bolts or rivets 14. The pressure device with the friction disks 6 is provided near the inner edge of the coupling disk 1. Different from the construction shown in Figures 1 and 2, the bolt 10, connecting the two friction disks, is not provided with a thread but is formed as a rivet. To produce the frictional pressure, a dome-shaped star spring 11 is shown by way of example.

What I claim is:

1. A disk coupling comprising a hub member, a coupling disk member carried by said hub member, springs arranged between said members and mounted in respective recesses provided in said members, vibration absorbers in the form of friction elements frictionally interconnecting said members, axial bolts for supporting said friction elements, springs acting on said elements to control the frictional interconnection of said members, and one or more guide disks carried by one of said members and having recesses for receiving respectively said friction elements, said elements being movable with said guide disk or disks in a circumferential direction, and movable in said latter recesses in the axial direction of said bolts against the pressing action of said last mentioned springs.

2. A disk coupling comprising a hub member, a coupling disk member carried by said hub member, springs arranged between said members and mounted in respective recesses provided in said members, vibration absorbers in the form of friction elements frictionally interconnecting said members, axial bolts each supporting and interconnecting a pair of friction elements on opposite sides of one of said members, springs acting on said elements to control the frictional interconnection of said members, and one or more guide disks carried by the other member, and having recesses for receiving respectively said friction elements, said elements being movable with said guide disk or disks in a circumferential direction, and movable in said latter recesses in the axial direction of said bolts against the pressing action of said last mentioned springs.

3. A disk coupling comprising a hub member, a coupling disk member carried by said hub member, springs arranged between said members and mounted in respective recesses provided in said members, vibration absorbers in the form of friction elements frictionally interconnecting said members, threaded axial bolts each supporting and interconnecting a pair of friction elements on opposite sides of one of said members, springs encircling said bolts respectively, and acting on said elements to control the frictional interconnection of said members, nuts on said bolts respectively acting on said latter springs to adjust the tensions thereof, and one or more guide disks carried by the other member, and having recesses for receiving respectively said friction elements, said elements being movable with said guide disk or disks in a circumferential direction, and movable in said latter recesses in the axial direction of said bolts against the pressing action of said last mentioned springs.

RICHARD BINDER.